UNITED STATES PATENT OFFICE.

MORDUCH L. KAPLAN, OF BROOKLYN, NEW YORK.

PROCESS OF PREPARING MANGANESE PEROXID.

1,287,041. Specification of Letters Patent. Patented Dec. 10, 1918.

No Drawing. Application filed August 4, 1917. Serial No. 184,478.

*To all whom it may concern:*

Be it known that I, MORDUCH L. KAPLAN, a citizen of the United States, and a resident of Brooklyn, in the county of Kings and State of New York, have invented certain new and useful Improvements in Processes of Preparing Manganese Peroxid, of which the following is a specification.

The object of the present invention is to provide an economic method for the preparation of artificial manganese peroxid suitable to be used as a depolarizer in the Leclanché cell, which requires a fine loose powder of a high degree of purity and efficiency. As it is well known, a product of high efficiency and in a fine loose state can be obtained by the treatment of $MnCO_3$ with oxygen of the air at higher temperatures; but the product so obtained cannot be used directly as it always contains more or less $CO_2$. It requires therefore further treatments adding considerably to the cost. Furthermore, since $MnCO_3$ is obtained by precipitating soluble manganese salts with soda, which soluble salts in their turn are obtained by treating mineral manganese peroxid with acids, the transformation of the mineral into the artificial product is a complicated process requiring the use of acids and soda.

The following formula illustrating the different steps of the $MnCO_3$ process may be given here:

(1) $MnO_2$ (mineral)$+H_2SO_4=$
    $MnSO_4+O+H_2O$,
(2) $MnSO_4+Na_2CO_3=MnCO_3+Na_2SO_4$,
(3) $MnCO_3+O=MnO_2+CO_2$.

The sum total of these reactions is, therefore,

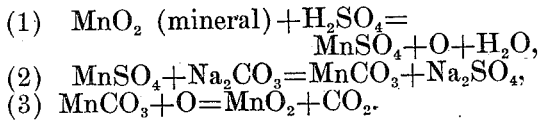

The last equation shows that for each equivalent of artificial manganese peroxid thus formed, one equivalent of soda and one of acid combine to form neutral salt, and, as the regeneration of $H_2SO_4$ and $Na_2CO_3$ out of $H_2O+CO_2+Na_2SO_4$ is quite a complicated process, the use of acid and soda in the process of making manganese peroxid must add considerably to the cost of the article. The present invention has as its object a process free of the above-enumerated objections and its essential feature is the carrying out of the reaction:

in both directions indicated by the arrows in the following manner:

Finely powdered mineral manganese peroxid is subjected at ordinary temperatures and in the presence of water to the action of nitrogen oxids such as $NO_2$, whereby a solution of $Mn(NO_3)_2$ is obtained:

$$MnO_2+2NO_2=Mn(NO_3)_2$$

The presence of water is necessary as otherwise the reaction soon comes to a halt on account of the surface of the powder being covered with nitrate salt. As the above reaction is the exact reversal of the decomposition of manganese nitrate at 170° C.,

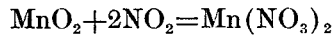

theoretically the gas obtained while decomposing the formed nitrate at higher temperatures ought to be sufficient to dissolve a new portion of ore equal to the previous one; but in practice it was found that small additions of nitrogen oxid are necessary in order to make up for losses due to incomplete absorption. In order to reduce the losses in gas as far as possible, it is advisable to have at least two absorption vessels, each one containing a mixture of powdered mineral with water and provided with a stirrer so as to be able to agitate the mixture lively while the gas is being passed through. Instead of the above arrangement the gas could be passed through towers filled with broken ore over which water is circulated by means of a pump.

In any case care should be taken to admix a small quantity of air into the gas for the purpose of changing NO, formed by the action of manganous oxid MnO present in the ore, into $NO_2$. The nitrate solution so obtained requires considerable evaporation before it can be heated to the decomposition point.

As pure $Mn(NO_3)_2$ leaves on decomposition a hard product requiring pulverization, I have found it advisable to add to the solution considerable quantities of an alkali-metal-nitrate, preferably $NaNO_3$, the presence of which in the product of decomposition causes the latter to fall apart on being boiled with water.

In order to avoid unnecessary evaporation, the alkali-metal nitrate is extracted from the insoluble manganese product with as little water as possible and the solution so obtained is from now on used instead of pure water for mixing with new portions of ore.

The remaining insoluble product after removal of all traces of nitrates by washing and after drying at about 70° C. was found to consist of artificial manganese peroxid of a high degree of purity and efficiency. The last-mentioned qualities, especially the efficiency as a battery depolarizer, were found to be greatly influenced by the way the decomposition of the nitrate is carried out, since overheating of the product injures it by causing it to lose oxygen.

It should also be mentioned here that an addition of conducting material, such as graphite, to the solution of the nitrates before decomposing the latter, increases the depolarizing properties of the product. This is partly due to the fact that in this way a more intimate mixture of depolarizer with conducting material is insured, but it is mainly due to the more even heating of the nitrate during decomposition made possible by the presence of a conductor.

What I claim as my invention and desire to secure by Letters-Patent, is:

1. A method of preparing artificial manganese peroxid suitable for use as a depolorizer in the Leclanché cell which comprises subjecting powdered mineral manganese peroxid in the presence of water to the action of a nitrogen oxid, adding an alkali-metal-nitrate to the solution and decomposing the manganous nitrate.

2. A method of preparing artificial manganese peroxid comprising the forming of a solution of manganous nitrate by the action of nitrogen oxid on mineral manganese peroxid, and decomposing the manganous nitrate in the presence of another nitrate.

3. In a method of preparing artificial manganese peroxid, decomposing of manganous nitrate in the presence of another nitrate.

Signed at New York city, in the county of New York and State of New York, this 3rd day of August A. D. 1917.

MORDUCH L. KAPLAN.

Witnesses:
 CHAS C. GILL,
 ARTHUR MARION.